Patented Feb. 3, 1948

2,435,458

UNITED STATES PATENT OFFICE 2,435,458

CATIONIC ISOQUINOLINE PESTICIDE

Hugh H. Mosher, Teaneck, N. J., and Frank L. Howard, Kingston, R. I., assignors to Onyx Oil & Chemical Company, a corporation of Delaware No Drawing. Application December 9, 1943, Serial No. 513,626

4 Claims. (Cl. 167—33)

This invention relates to an improved process for the treatment of higher plants to protect them against the action of pests and fungi, etc.

According to the present invention the higher plants are treated by applying to the organs of the plants compositions of matter comprising isoquinolinium compounds having, attached to the nitrogen atom, an alkyl radical containing from 8 to 18 carbon atoms. The preferred compositions used in the process of our invention are characterized by the following formula:

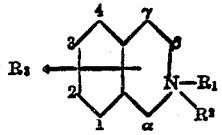

in which $R_1$ is an alkyl group of 8 to 18 carbon atoms; $R_2$ is an acid radical (say a halide); and $R_3$ represents one or more alkyl groups (of 1 to 4 carbon atoms) or hydroxyl groups in the $\alpha, \beta, \gamma, 1, 2, 3,$ or 4 positions.

The compounds used in the process of our invention may be prepared very simply by reacting isoquinoline or an isoquinoline derivative containing the $R_3$ radicals with an appropriate alkyl halide. Thus isoquinoline may be reacted with lauryl chloride in the absence of water at 120° to 130° C. over a two hour period. Likewise, isoquinoline may be reacted with cetyl bromide under similar conditions. The product of the first reaction is lauryl isoquinolinium chloride; that of the second is cetyl isoquinolinium bromide. Both are colorless to light amber liquids which are soluble in many organic solvents including acetone and certain glycol ethers such as the "Cellosolves" and "Carbitol" of Carbide and Carbon Chemical Corporation, for example, the mono ethyl ether of diethylene glycol. The compounds are insoluble in ether and in many hydrocarbons, including gasoline and naphtha. They are quite soluble in hot water and moderately soluble in cold. Clear cold solutions of the compounds can be prepared with coupling agents including acetone, "Cellosolves" and "Carbitol."

The compounds used in the process are surface active and cationic in nature and have good wetting, penetrating and emulsifying properties. Aqueous solutions containing the compounds foam vigorously and all of the compounds exert a marked detergent action.

The compounds used have marked antiseptic properties and are toxic to bacteria and Mycophyta, as well as to other micro-flora and micro-fauna.

The compounds are particularly useful in protecting higher plants against the action of pests, for their toxic character with respect to micro-flora and micro-fauna, their high detergency, and their cationic nature make them excellent for the treatment of the organs of higher plants to prevent the attack of bacteria, fungi, etc.

The fungicidal action of two of the compounds are shown in the following Table I, which is a summary of a fungous spore dosage response germination test.

Table I.—*Potential fungicidal value using macrosporium sarcinaeforme spores on cellulose nitrate surface*

PROTECTANT ACTION

| Treatment | .001% | .0005% | .00025% | .0001% |
|---|---|---|---|---|
| Lauryl isoquinolinium bromide | [1] 96 | 63 | 40 | 10 |
| Cetyl isoquinolinium bromide | 96 | 83 | 26 | 3 |

[1] Mean per cent inhibition concentration.

The compounds are particularly useful as plant sprays, for they are substantially colorless (or at most very slightly colored), whereas normal quinolinium compounds are highly colored—usually bright red. Moreover, the compounds can be used in relatively high concentrations on plant foliage without producing substantial injury. This is shown by the following:

Table II.—*Phytotoxicity of isoquinolinium compounds on succulent greenhouse tomato foliage. The average per cent of leaf area killed by increasing concentrations of the toxicant is shown when a "dip" method was used*

| Treatment | Average Per Cent Injury |
|---|---|
| Lauryl isoquinolinium chloride: | |
| .05% solution | 11.6 |
| .1% solution | 13.3 |
| .2% solution | 30.0 |
| .4% solution | 70.0 |
| Cetyl isoquinolinium bromide: | |
| .05% solution | 6.0 |
| .1% solution | 10.0 |
| .2% solution | 20.0 |
| .4% solution | 36.6 |

For use in plant treatment of said plants, the compounds should not be used at concentrations greater than one part in 2000, because of their phytotoxicity at higher concentrations. However, they need not be used at concentrations even as high as one in 2000, for they are remarkably effective in the destruction of bacteria and fungi at lower concentrations, say as low as one part in 100,000.

We claim:

1. In the treatment of higher plants to protect them against the action of pests and fungi, etc., the improvement which comprises applying to organs of the plants a cationic isoquinolinium compound having attached to its nitrogen an acid radical and a straight chain hydrocarbon radical containing 8 to 18 carbon atoms.

2. In the treatment of higher plants to protect them against the action of pests and fungi, etc., the improvement which comprises applying to organs of the plants a solution of a cationic isoquinolinium compound having attached to its nitrogen an acid radical and a straight chain hydrocarbon radical containing 8 to 18 carbon atoms, the concentration of the compound in the solution being from 1:2000 to 1:100000.

3. In the treatment of higher plants to protect them against the action of pests and fungi, etc., the improvement which comprises applying to organs of the plants a cationic isoquinolinium compound having attached to its nitrogen an acid radical and an alkyl radical containing 8 to 18 carbon atoms.

4. In the treatment of higher plants to protect them against the action of pests, fungi, etc., the improvement which comprises applying to organs of the plants a cationic isoquinolinium compound having attached to its nitrogen an acid radical and an alkyl radical containing 8 to 18 carbon atoms, the concentration of the compound in the solution being from 1:2000 to 1:100,000.

HUGH H. MOSHER.
FRANK L. HOWARD.

REFERENCES CITED

The following references are of record in the file of this patent:

UNITED STATES PATENTS

| Number | Name | Date |
|---|---|---|
| 2,295,504 | Shelton | Sept. 8, 1942 |
| 2,075,359 | Salzberg | Mar. 30, 1937 |
| 2,292,423 | Yohe | Aug. 11, 1942 |
| 478,495 | Ziegler | July 5, 1892 |
| 1,806,563 | Prill | May 19, 1931 |
| 505,141 | Tausk | Sept. 19, 1893 |

FOREIGN PATENTS

| Number | Country | Date |
|---|---|---|
| 18,516 | Great Britain | 1894 |